United States Patent [19]

Ishigami

[11] Patent Number: 5,247,688
[45] Date of Patent: Sep. 21, 1993

[54] CHARACTER RECOGNITION SORTING APPARATUS HAVING COMPARATORS FOR SIMULTANEOUS COMPARISON OF DATA AND CORRESPONDING KEY AGAINST RESPECTIVE MULTISTAGE SHIFT ARRAYS

[75] Inventor: Masayuki Ishigami, Tokyo, Japan

[73] Assignee: Ricoh Company, Ltd., Tokyo, Japan

[21] Appl. No.: 418,386

[22] Filed: Oct. 6, 1989

[30] Foreign Application Priority Data

Oct. 14, 1988 [JP] Japan ................................ 258576

[51] Int. Cl.$^5$ ............................................ G06F 7/06
[52] U.S. Cl. ............................... 395/800; 395/600; 364/DIG. 2; 364/244.5; 364/259.2; 364/259.5; 364/958; 364/958.1; 364/962.3; 364/965.7
[58] Field of Search ... 364/200 MS File, 900 MS File; 382/13; 395/800, 425, 600

[56] References Cited

U.S. PATENT DOCUMENTS

| | | | |
|---|---|---|---|
| 3,611,316 | 10/1971 | Woodrum | 395/800 |
| 3,931,612 | 1/1976 | Stevens et al. | 395/600 |
| 4,003,031 | 1/1977 | Kashio | 395/600 |
| 4,030,077 | 6/1977 | Florence et al. | 364/200 |
| 4,031,520 | 6/1977 | Rohner | 395/800 |
| 4,142,234 | 2/1979 | Bean et al. | 395/425 |
| 4,183,086 | 1/1980 | Kober | 395/425 |
| 4,408,275 | 10/1983 | Kubo et al. | 364/200 |
| 4,561,105 | 12/1985 | Crane et al. | 382/13 |
| 4,573,196 | 2/1986 | Crane et al. | 382/13 |
| 4,604,726 | 8/1986 | Terzian | 364/900 |
| 4,611,310 | 9/1986 | Durbin | 365/230 |
| 4,628,483 | 12/1986 | Nelson | 395/800 |
| 4,718,102 | 1/1988 | Crane et al. | 382/13 |
| 5,068,822 | 11/1991 | Lawrence | 395/775 |

Primary Examiner—Parshotam S. Lall
Assistant Examiner—Krisna Lim
Attorney, Agent, or Firm—Mason, Fenwick & Lawrence

[57] ABSTRACT

A sorting apparatus comprises a register part for holding an input data and a corresponding key, a shift array part for holding data and corresponding keys in a plurality of stages and having a load mode and a shift mode, a comparator part for simultaneously comparing the input data and the corresponding key which are held in the register part with the data and the corresponding keys held in the shift array part and for outputting comparison results, and a controller for controlling the shift array part to the load mode for loading the data and the corresponding key held in the register part and to the shift mode for shifting the data and the corresponding key held in the shift array part depending on the comparison results received from the comparator part so that the data and the corresponding keys are arranged in the shift array part in a sequence dependent on a priority of the keys.

10 Claims, 10 Drawing Sheets

FIG. 1A
PRIOR ART

| CHARACTER CODE | DISTANCE |
|---|---|
| A | 30 |
| B | 40 |
| C | 70 |
| D | 100 |
| E | 110 |
| F | 120 |
| G | 120 |
| H | 200 |
| I | 210 |
| J | 240 |

FIG. 1B
PRIOR ART

| CHARACTER CODE | DISTANCE |
|---|---|
| A | 30 |
| B | 40 |
| C | 70 |
| K | 80 |
| D | 100 |
| E | 110 |
| F | 120 |
| G | 120 |
| H | 200 |
| I | 210 |

FIG. 2A
PRIOR ART

| CHARACTER CODE | DISTANCE |
|---|---|
| A | 30 |
| B | 40 |
| C | 70 |
| D | 100 |
| E | 110 |
| F | 120 |
| G | 120 |
| H | 200 |
| I | 210 |
| J | 240 |

FIG. 2B
PRIOR ART

| CHARACTER CODE | DISTANCE |
|---|---|
| A | 30 |
| B | 40 |
| C | 70 |
| G | 80 |
| D | 100 |
| E | 110 |
| F | 120 |
| H | 200 |
| I | 210 |
| J | 240 |

CHARACTER RECOGNITION SORTING APPARATUS HAVING COMPARATORS FOR SIMULTANEOUS COMPARISON OF DATA AND CORRESPONDING KEY AGAINST RESPECTIVE MULTISTAGE SHIFT ARRAYS

BACKGROUND OF THE INVENTION

The present invention generally relates to sorting apparatuses, and more particularly to a sorting apparatus for sorting data in a predetermined sequence depending on a key of the data. For example, the sorting apparatus is suited for use in a character recognition apparatus when candidate character codes must be sorted at a high speed by taking as the key a distance from a dictionary, that is, the distance between a feature pattern of the candidate character code and a registered feature pattern in the dictionary.

In a kanji (Chinese character) optical character reader (OCR), a feature is extracted from a character image which is to be recognized and a recognition result (candidate) is determined by matching the extracted feature with a standard feature dictionary. When matching the extracted feature with each template (feature pattern of each character in the dictionary), the candidates must be sorted with reference to a key which is the distance in this case.

Figure 1A:
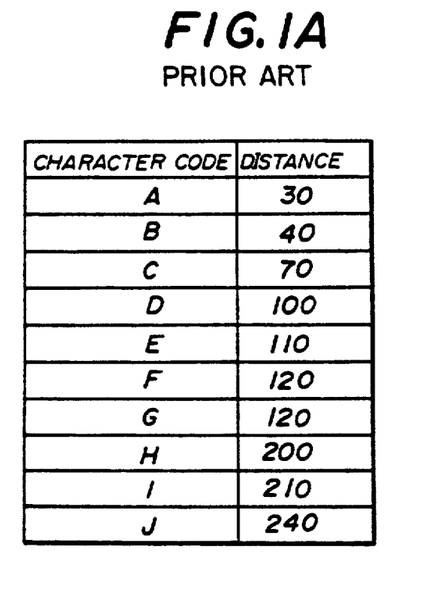
FIGS. 1A and 1B are diagrams for explaining a conventional sorting method when inserting a candidate which is not included in registered candidates.
Figure 1B:
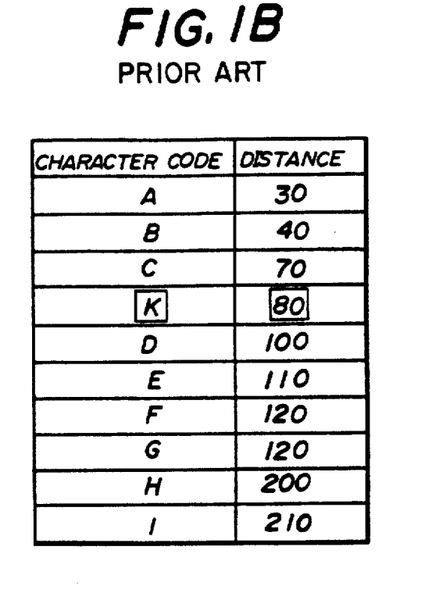

An example of a sorting will be described with reference to FIGS. 1A and 1B. It is assumed that ten character codes "A" through "J" of the candidates are already sorted with reference to the key which is the distance as shown in FIG. 1A. In this state, when a character code "K" of a candidate is matched with the template and the distance is "80" (this will be indicated as (K, 80)), this character code "K" is inserted between the character codes "C" and "D" as shown in FIG. 1B.

Figure 2A:
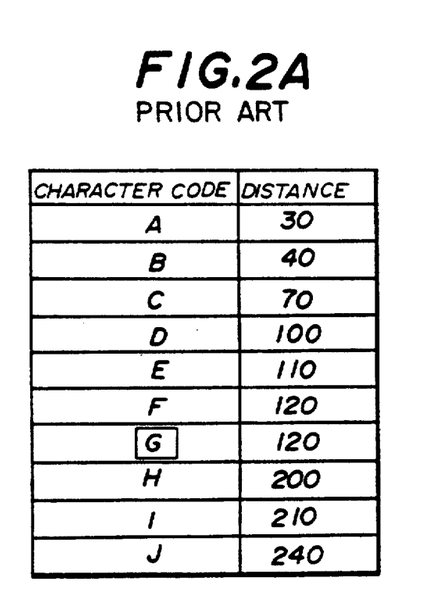
FIGS. 2A and 2B are diagrams for explaining a conventional sorting method when inserting a candidate which is included in the registered candidates.
Figure 2B:
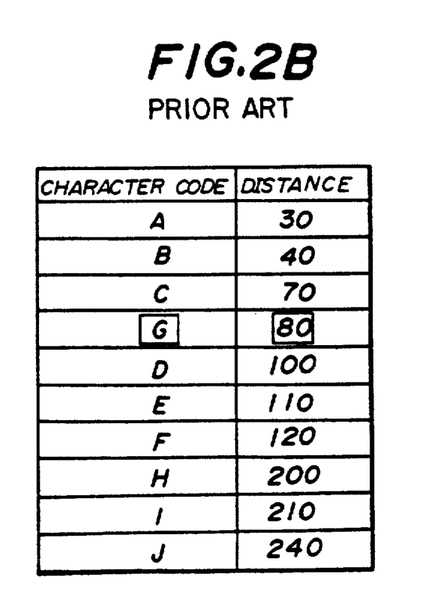

On the other hand, there are cases where a plurality of templates are prepared for the same character code for the purpose of improving the recognition rate so as to cope with a multifont, for example. In such cases, it is necessary to take measures so that the same character code is not included in the character codes of the candidates a plurality of times. An example of a sorting in such cases will be described with reference to FIGS. 2A and 2B. It is assumed that ten character codes "A" through "J" of the candidates are already sorted with reference to the key which is the distance as shown in FIG. 2A. In this state, when a character code "G" of a candidate is matched with the template and the distance is "80" (this will be indicated as (G, 80)), the same character code "G" is already included in the character codes of the candidates. Hence, this character code "G" is inserted between the character codes "C" and "D" as shown in FIG. 2B and the character code "G" which has the larger distance "120" (G, 120) is deleted from the character codes of the candidates as shown in FIG. 2B.

In the kanji OCR, the number of candidates output for the after-processing is generally ten and the character codes of ten candidates are shown in FIGS. 1A through 2B for this reason. Normally, a kanji code such as a kanji (or graphic) shift code is used as the character code, but the character codes are denoted by alphabets in FIGS. 1A through 2B for the sake of convenience.

Conventionally, the above described sorting is carried out by a software processing using a central processing unit (CPU) and a memory. However, it is necessary to compare the distance of the character code of each candidate from the character codes of the registered candidates to determine the inserting position of the character code and thereafter shift the position of the registered candidates with character codes having the distances greater than that of the inserted character code. The shifting of the registered candidates involves a repetition of reading and writing of the registered character code, and it is difficult to shift the registered candidates at a high speed. Furthermore, a similar operation is required to shift the registered candidates when eliminating the double registration of the same character code.

On the other hand, there is a proposed sorting system which writes the character code by taking the value of the distance as an index of the memory address. But this proposed sorting system suffers a problem in that a considerably large memory capacity is required depending on a maximum value of the distance which is considered valid as a candidate. In addition, this proposed sorting system is unsuited for realization on a single semiconductor chip. Moreover, an independent process must be carried out to exclude the double registration of the same character code.

Furthermore, a pipeline merge sorter, a bitonic sorter and the like which carry out the sorting by hardware have been proposed mainly for application to data base systems. However, such systems suffer a problem in that the circuit construction becomes too complex for the purpose of sorting the candidates in a character recognition apparatus, for example.

SUMMARY OF THE INVENTION

Accordingly, it is a general object of the present invention to provide a novel and useful sorting apparatus in which the problems described above are eliminated.

Another and more specific object of the present invention is to provide a sorting apparatus comprising holding means for holding an input data and a corresponding key, shift array means for holding data and corresponding keys in a plurality of stages and having a load mode and a shift mode, comparator means for simultaneously comparing the input data and the corresponding key which are held in the holding means with the data and the corresponding keys held in the shift array means and for outputting comparison results, and control means for controlling the shift array means to the load mode for loading the data and the corresponding key held in the holding means and to the shift mode for shifting the data and the corresponding key held in the shift array means depending on the comparison results received from the comparator means so that the data and the corresponding keys are arranged in the shift array means in a sequence dependent on a priority of the keys. According to the sorting apparatus of the present invention, the sorting apparatus can easily be realized on a single chip due to the simple construction thereof. The sorting apparatus can carry out a high-speed sorting and is especially suited for application to a sorting of recognition results obtained from a kanji optical character reader.

Other objects and further features of the present invention will be apparent from the following detailed description when read in conjunction with the accompanying drawings.

DESCRIPTION OF THE PREFERRED EMBODIMENTS

First, a description will be given of a first embodiment of a sorting apparatus according to the present invention, by referring to FIG. 3. For example, this embodiment may be applied to a character recognition apparatus which has a construction generally shown in FIG. 4.

Figure 4:
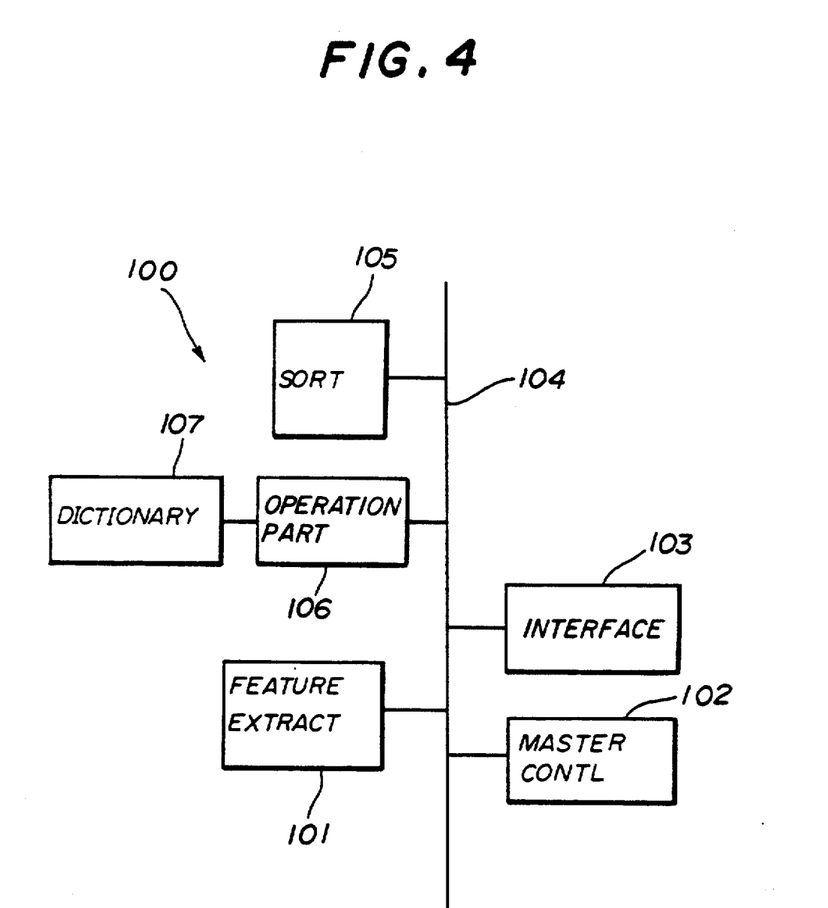
FIG. 4 is a system block diagram generally showing an embodiment of a character recognition apparatus to which the first embodiment shown in FIG. 3 may be applied.

In FIG. 4, a matching part 100, a feature extracting part 101, a master controller 102 and an interface 103 are coupled via an internal bus 104. The matching part 100 comprises a sorting apparatus 105, an operation part 106 and a dictionary 107. Under a control of the master controller 102, an image data which is related to an input character is supplied via the interface 103 to the feature extracting part 101 wherein the feature of the input character is extracted. The extracted feature is supplied to the operation part 106 which matches the extracted feature with registered data stored in the dictionary 107. Recognition results obtained as a result of the matching are supplied from the dictionary 107 to the sorting apparatus 105 which sorts the recognition results. The recognition result includes the character code and the distance (distance data) of the input character from the dictionary 107. The distance from the dictionary 107 refers to the distance between the feature pattern of the candidate and the registered (standard) feature pattern in the dictionary 107.

Figure 3:
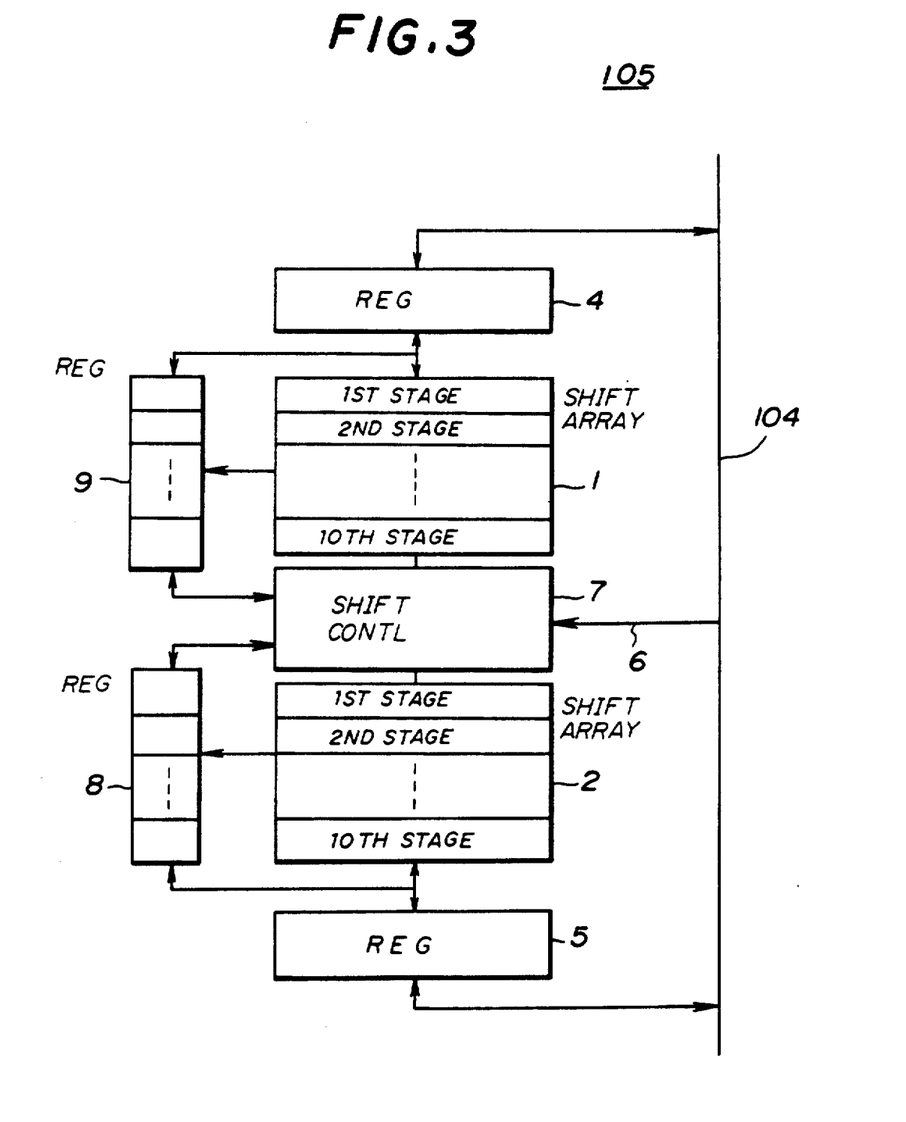
FIG. 3 is a system block diagram showing a first embodiment of a sorting apparatus according to the present invention.

The character codes of the recognition results are sorted within a character code shift array 1 of the sorting apparatus 105 shown in FIG. 3, while the distance data of the recognition result are sorted within a distance data shift array 2. Both the character codes and the distance data of the recognition results are sorted in a sequence from a smallest data. Hereunder, the recognition results will be referred to as candidates.

The sorting apparatus 105 shown in FIG. 3 comprises the character code shift array 1, the distance data shift array 2, the internal bus 104, a character code register 5, a shift controller 7, a distance data comparator 8, and a character code comparator 9. When inserting the character code and the distance of a new candidate, the character code from the operation part 106 is set in the character code register 4 via the internal bus 104 while the distance data from the operation part 106 is set in the distance data register 5, and the shift controller 7 is started in response to a control signal which is received from the master controller 102 and supplied to the controller 7 via the internal bus 104 and a control line 6.

The distance data comparator 8 simultaneously compares the distance data which is set in the distance data register 5 and the distance data which are registered in the distance data shift array 2, and supplies comparison results to the shift controller 7. In this embodiment, a maximum of ten distance data are registered in the distance data shift array 2. At the same time, the character code comparator 9 simultaneously compares the character code which is set in the character code register 4 and the character codes which are registered in the character code shift array 1, and supplies comparison results to the shift controller 7. In this embodiment, a maximum of ten character codes are registered in the character code shift array 1.

When the shift controller 7 is started, the shift controller 7 carries out a simple logic operation which will be described later on the comparison results which are received from the comparators 8 and 9. Then, the shift controller 7 operates the shift arrays 1 and 2 depending on the result of the logic operation so as to secure inserting spaces for inserting the character code which is set in the character code register 4 and the distance data which is set in the distance data register 5. Thereafter, the shift controller 7 writes the character code which is set in the character code register 4 into the inserting space of the character code shift array 1 and writes the distance data which is set in the distance data register 5 into the inserting space of the distance data shift array 2. The character code and the distance data of the candidates can successively be read out on the internal bus 104 via the registers 4 and 5 as the final recognition result.

Figure 5:
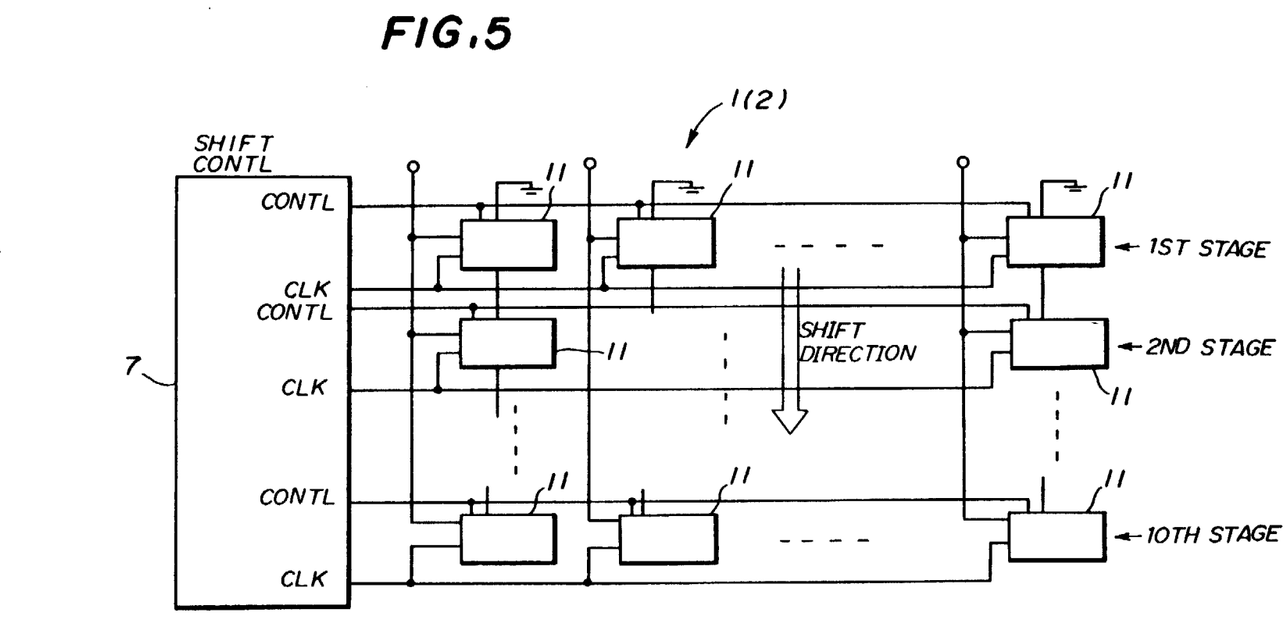
FIG. 5 is a system block diagram showing an embodiment of a shift array of the sorting apparatus shown in FIG. 3.

FIG. 5 shows an embodiment of the shift array. The shift array may be the character code shift array 1 or the distance data shift array 2 shown in FIG. 3 because the two shift arrays 1 and 2 may have the same construction. The shift array comprises a plurality of shift elements 11 for holding and shifting one bit of data. The shift elements 11 which are arranged horizontally in a row hold one character code or one distance data, and ten such rows are provided in this embodiment. Such rows will hereunder be referred to as stages, and it is assumed that the data is successively shifted from a first stage towards the tenth stage. The shift elements 11 belonging to the same stage are simultaneously controlled by the shift controller 7.

Figure 6:
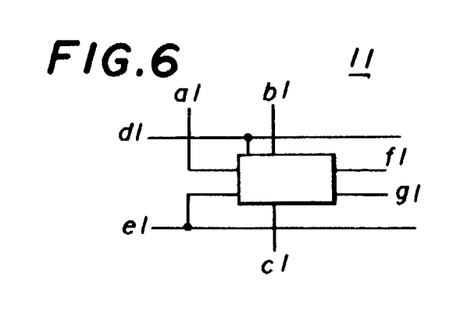
FIG. 6 is a block diagram showing inputs and outputs of a shift element of the shift array shown in FIG. 5.

FIG. 6 shows inputs and outputs of one shift element 11. The shift element 11 is connected to a load data input line a1, a shift data input line b1, a shift data output line c1, a shift mask line d1, a load mask line e1, a shift/load designation line f1, and a clock input line g1. The lines d1, e1 and f1 are control lines.

Figure 7:
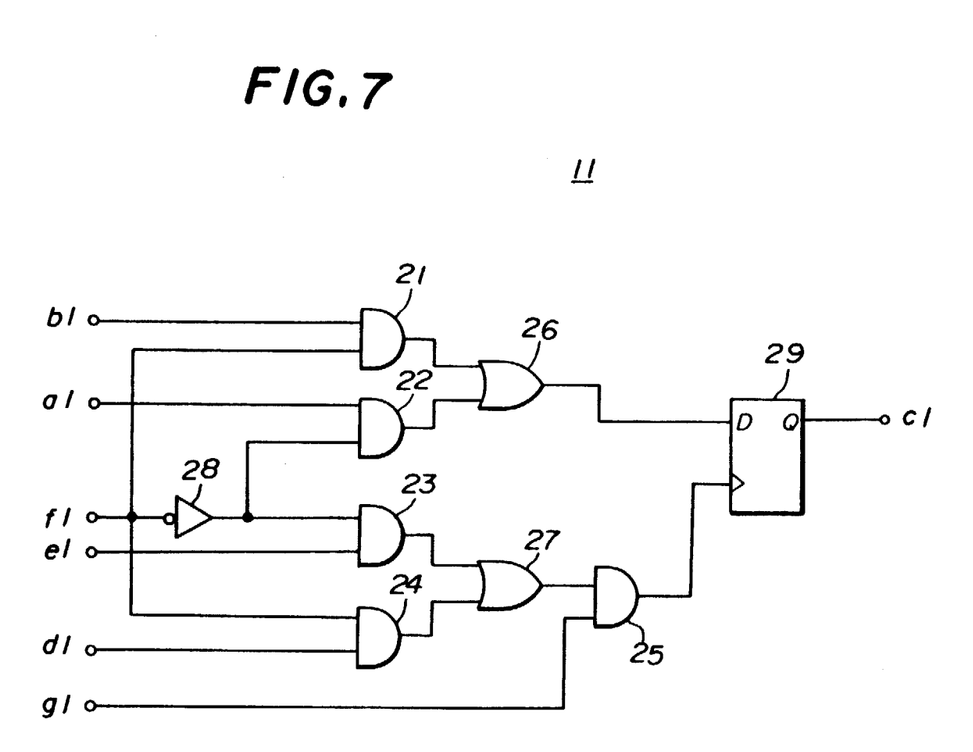
FIG. 7 is a circuit diagram showing an embodiment of the shift element shown in FIGS. 5 and 6.

FIG. 7 shows an embodiment of the shift element 11. The shift element 11 generally comprises AND circuits 21 through 25, OR circuits 26 and 27, an inverter 28 and a flip-flop circuit 29 which are connected as shown. The same signal line designations are used as in FIG. 6. The data (character code or distance data) which is received from the register 4 or 5 is applied to the load data input line a1, while the data which is shifted and output from a previous stage is applied to the shift data input line b1. The held data is output on the shift data output line c1. A shift mask signal for controlling the shift is applied to the shift mask line d1 from the shift controller 7. A load mask signal for controlling the data input is applied to the load mask line e1 from the shift controller 7. In addition, a load/shift signal for selecting the shift or the load mode is applied to the load/shift designation line f1 from the shift controller 7. A clock signal from the shift controller 7 is applied to the clock input line g1.

Figure 8:
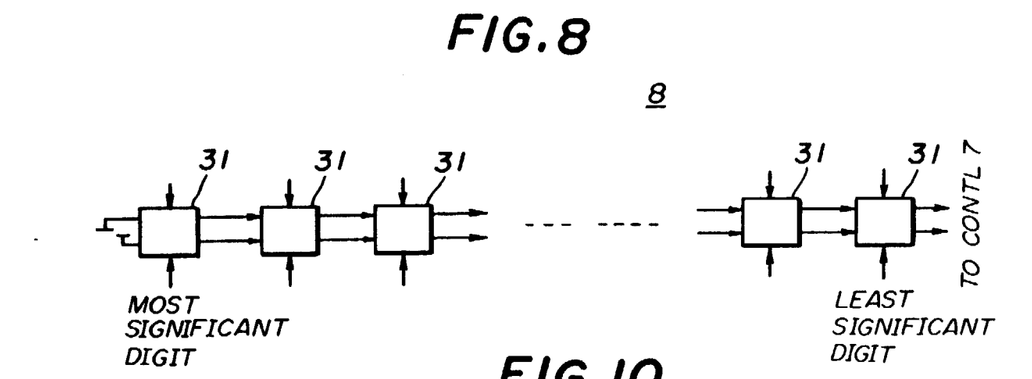
FIG. 8 is a system block diagram showing an embodiment of a distance data comparator of the sorting apparatus shown in FIG. 3.

FIG. 8 shows an embodiment of the distance data comparator 8 shown in FIG. 3. The distance data comparator 8 comprises a plurality of distance data comparing elements 31 respectively for comparing one bit of distance data. The number of comparing elements 31 is equal to a number of bits of one distance data. In this embodiment, a total of ten comparing elements 31 are provided in correspondence with the ten stages of the distance data shift array 2, and the ten comparing elements 31 operate simultaneously.

Figure 9:
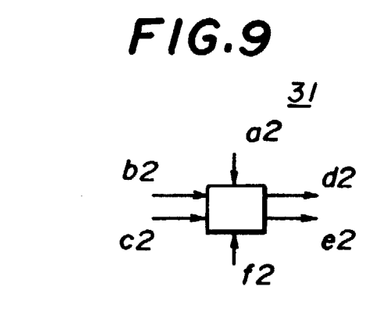
FIG. 9 is a block diagram showing inputs and outputs of a comparing element of the distance data comparator shown in FIG. 8.

FIG. 9 shows inputs and outputs of one comparing element 31. The comparing element 31 is connected to input lines a2, b2, c2 and f2, and output lines d2 and e2. The input line a2 receives a corresponding bit of an object distance data which is set in the distance data register 5. The input line f2 is connected to the shift data output line c1 of a corresponding bit in a corresponding stage of the distance data shift array 2. The output line d2 becomes active (valid) when the registered distance data is greater than the object distance data, and the output line e2 becomes active when the registered distance data is equal to the object distance data. The input line b2 is connected to the output line d2 of the comparing element 31 which corresponds to a higher significant bit, and the input line c2 is connected to the output line e2 of the comparing element 31 which corresponds to a higher significant bit.

Figure 10:
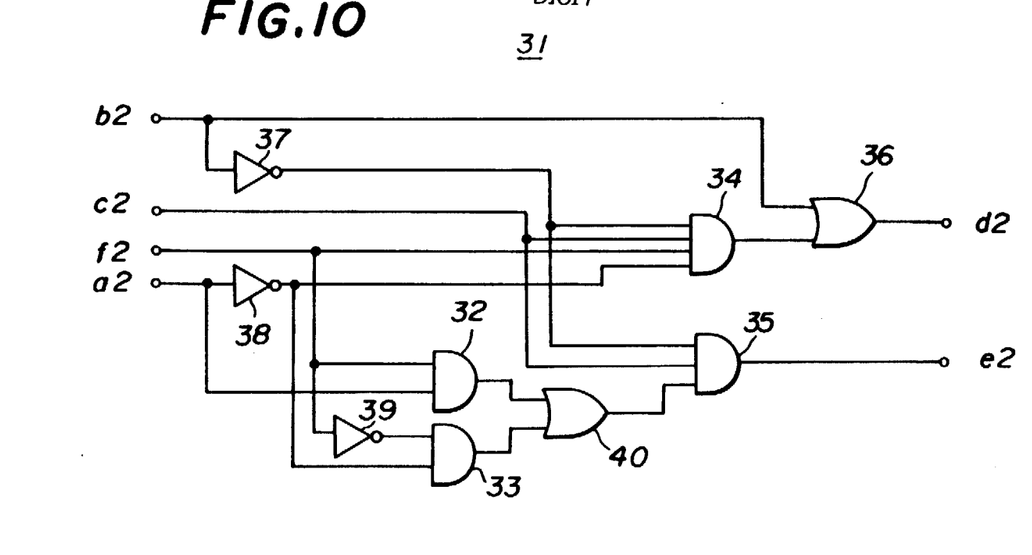
FIG. 10 is a circuit diagram showing an embodiment of the comparing element shown in FIGS. 8 and 9.

FIG. 10 shows an embodiment of the comparing element 31. The comparing element 31 generally comprises AND circuits 32 through 35, OR circuits 36 and 40, and inverters 37 through 39 which are connected as shown. In FIG. 10, the same signal line designations are used as in FIG. 9.

Figure 11:
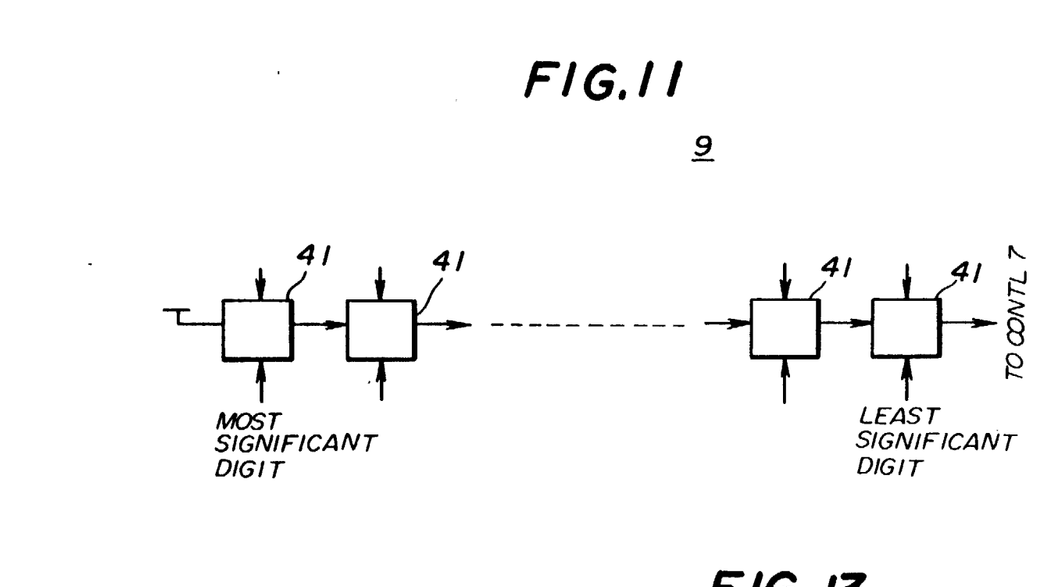
FIG 11 is a system block diagram showing an embodiment of a character code comparator of the sorting apparatus shown in FIG. 3.

FIG. 11 shows an embodiment of the character code comparator 9 shown in FIG. 3. The character code comparator 9 comprises a plurality of character code comparing elements 41 respectively for comparing one bit of character code. The number of comparing elements 41 is equal to a number of bits of one character code. In this embodiment, a total of ten comparing elements 41 are provided in correspondence with the ten stages of the character code shift array 1, and the ten comparing elements 41 operate simultaneously.

Figure 12:
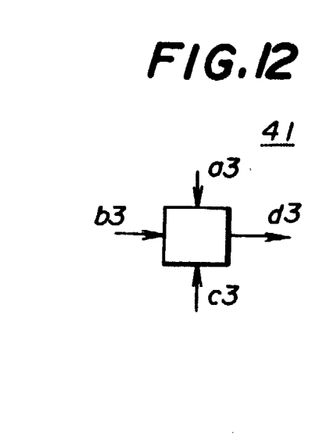
FIG. 12 is a block diagram showing inputs and outputs of a comparing element of the character code comparator shown in FIG. 11.

FIG. 12 shows inputs and outputs of one comparing element 41. The comparing element 41 is connected to input lines a3, b3 and c3 and an output line d3. The input line a3 receives a bit of a corresponding object character code which is set in the character code register 4. The input line c3 is connected to the shift data output line c1 of a corresponding bit in a corresponding stage of the character code shift array 1. The output line d3 becomes active (valid) when the registered character code is equal to the object character code. The input line b3 is connected to the output line d3 of the comparing element 41 which corresponds to a higher significant bit.

Figure 13:
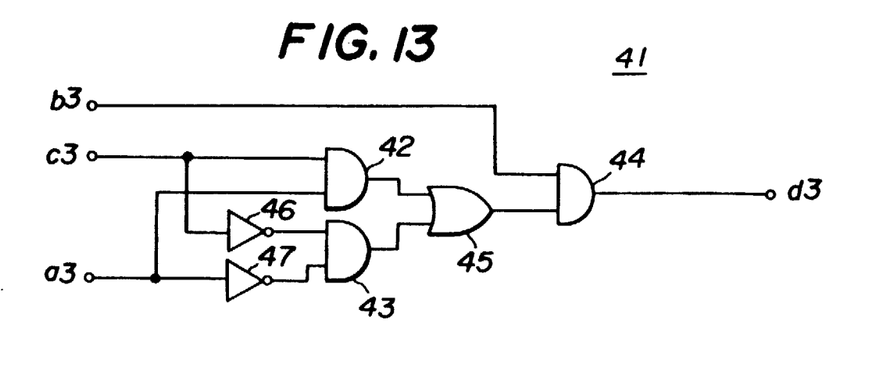
FIG. 13 is a circuit diagram showing an embodiment of the comparing element of the character code comparator shown in FIGS. 11 and 12.

FIG. 13 shows an embodiment of the comparing element 41. The comparing element 4 generally comprises AND circuits 42 through 44, an OR circuit 45, and inverters 46 and 47 which are connected as shown. In FIG. 13, the same signal line designations are used as in FIG. 12.

Figure 14:
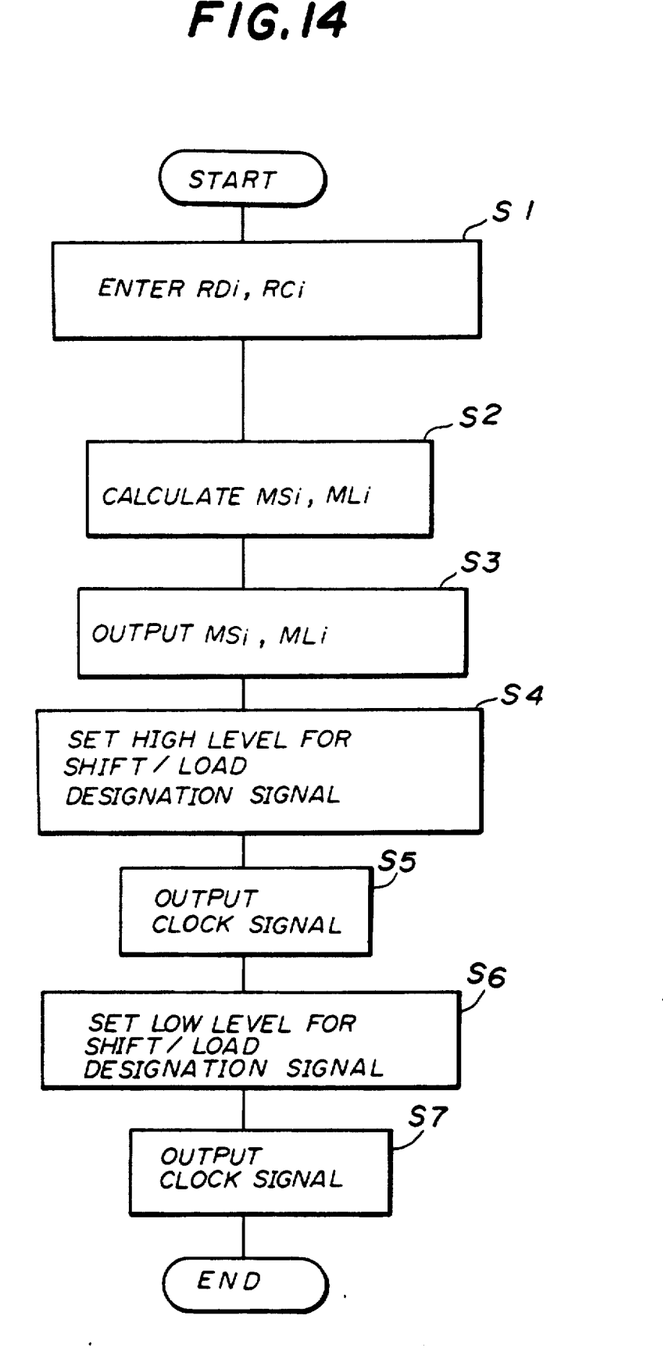
FIG. 14 is a flow chart for explaining an operation of a shift controller of the sorting apparatus shown in FIG. 3.

The shift controller 7 operates as shown in FIG. 14. Hereunder, the object distance data set in the distance data register 5 is denoted by D, the object character code set in the character code register 4 is denoted by C, the registered distance data is denoted by $D_i$, the registered character code is denoted by $C_i$, the comparison result output from the distance data comparator 8 is denoted by $RD_i$, and the comparison result output from the character code comparator 9 is denoted by $RC_i$, where $i = 1, \ldots, 10$ in this embodiment. The registered distance data $D_i$ corresponds to the distance data registered in the distance data shift array 2, and the registered character code $C_i$ corresponds to the character codes registered in the character code shift array 1.

A step S1 enters the comparison result $RD_i$ output from the distance data comparator 8 and the comparison result $RD_i$ output from the character code comparator 9. Then, a step S2 calculates a shift mask $MS_i$ and a load mask $ML_i$. The comparison result $RD_i$ is valid when $D_i > D$ and the comparison result $RC_i$ is valid when $C_i = C$. When it is assumed that $RX_i = RC_i \oplus RX_{i+1}$ and $RX = RC_1 + RC_2 + \ldots + RC_{10}$, the shift mask $MS_i = RX_i \cdot RD_i$ and the load mask $ML_i = (RD_i \oplus RD_{i-1}) \cdot MS_i$, where $RD_0 = 0$, "+" denotes a logical OR, "." denotes a logical AND, "$\oplus$" denotes an exclusive-OR and "−" denotes a negative.

A step S3 outputs the shift mask $MS_i$ to the corresponding shift mask lines d1 and the corresponding load mask lines e1 of the shift arrays 1 and 2. In this state, a step S4 supplies a high-level (active) shift/load designation signal to the corresponding shift/load designation lines f1 of the shift arrays 1 and 2, and a step S5 supplies a clock signal to the corresponding clock input lines g1 of the shift arrays 1 and 2. Then, a step S6 supplies a low-level (inactive) shift/load designation signal to the corresponding shift/load designation lines f1 of the shift arrays 1 and 2, and a step S7 supplies the clock signal to the corresponding clock input lines g1 of the shift arrays 1 and 2. An inserting space is secured in a certain stage of each of the shift arrays 1 and 2 in response to the clock signal which is first received from the shift controller 7. On the other hand, the object distance data and the object character code are written in the inserting spaces of the respective shift arrays 2 and 1 in response to the clock signal which is next received. When the same character code already exists in the registered candidates, the character code which has a larger distance is deleted by the above described operation.

Of course, when prior to starting the sorting operation, the character code shift array 1 is initialized by being cleared to zero (assuming a zero character code does not exist) and the distance data shift array 2 is initialized to a threshold value of a rejecting distance.

Next, a description will be given of a second embodiment of the sorting apparatus according to the present invention. In this embodiment, the same block system of the first embodiment shown in FIG. 3 may be used, and a description of this second embodiment will be given with reference to FIG. 3. However, the construction of the character code shift array 1 and the distance data shift array 2 are different from that shown in FIG. 5.

Figure 15:
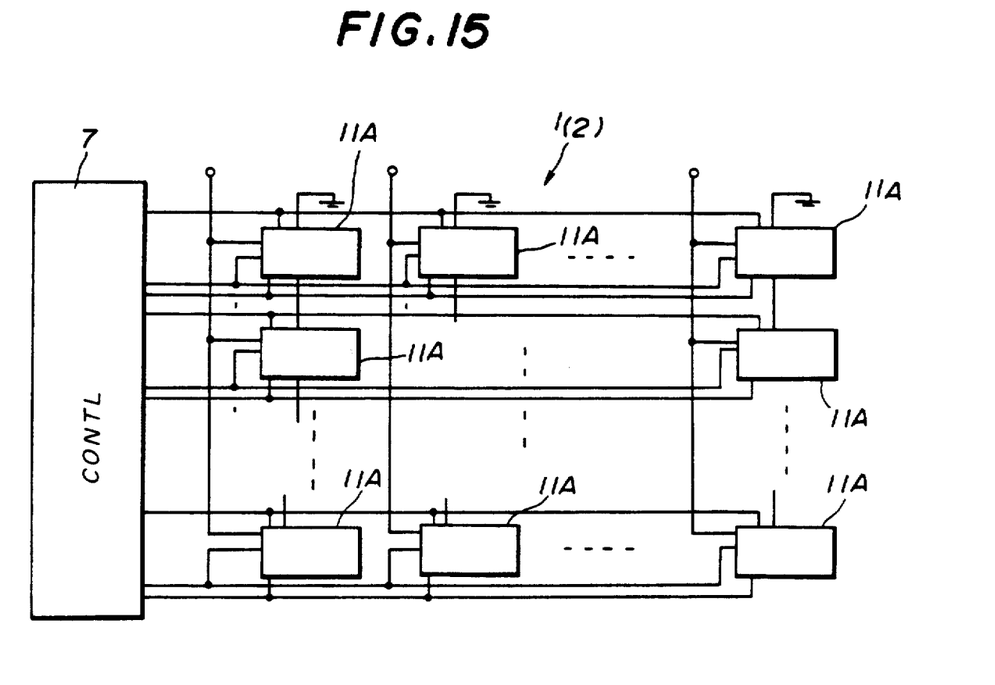
FIG. 15 is a system block diagram showing an embodiment of a shift array of a second embodiment of the sorting apparatus according to the present invention.

FIG. 15 shows an embodiment of the shift array. The shift array may be the character code shift array 1 or the distance data shift array 2 shown in FIG. 3 because the two shift arrays 1 and 2 may have the same construction. The shift array comprises a plurality of shift elements 11A for holding and shifting one bit of data. The shift elements 11A which are arranged horizontally in a row hold one character code or one distance data, and ten such rows are provided in this embodiment. Such rows will hereunder be referred to as stages, and it is assumed that the data is successively shifted from a first stage towards the tenth stage. The shift elements 11A belonging to the same stage are simultaneously controlled by the shift controller 7.

Figure 16:
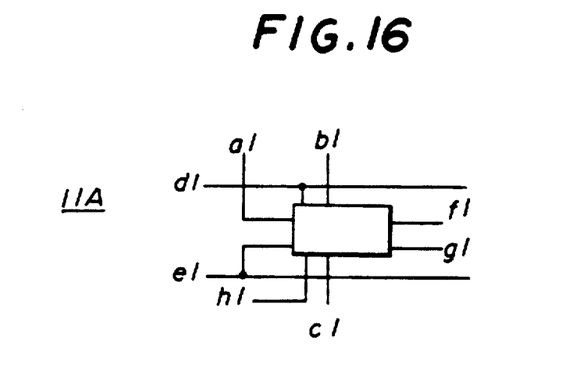
FIG. 16 is a block diagram showing inputs and outputs of a shift element of the shift array shown in FIG. 15.

FIG. 16 shows inputs and outputs of one shift element 11A. The shift element 11A is connected to a load data input line a1, a shift data input line b1, a shift data output line c1, a shift mask line d1, a load mask line e1, a shift-/load designation line f1, a clock input line g1, and a shift up/down line h1. The lines d1, e1, f1 and h1 are control lines.

Figure 17:
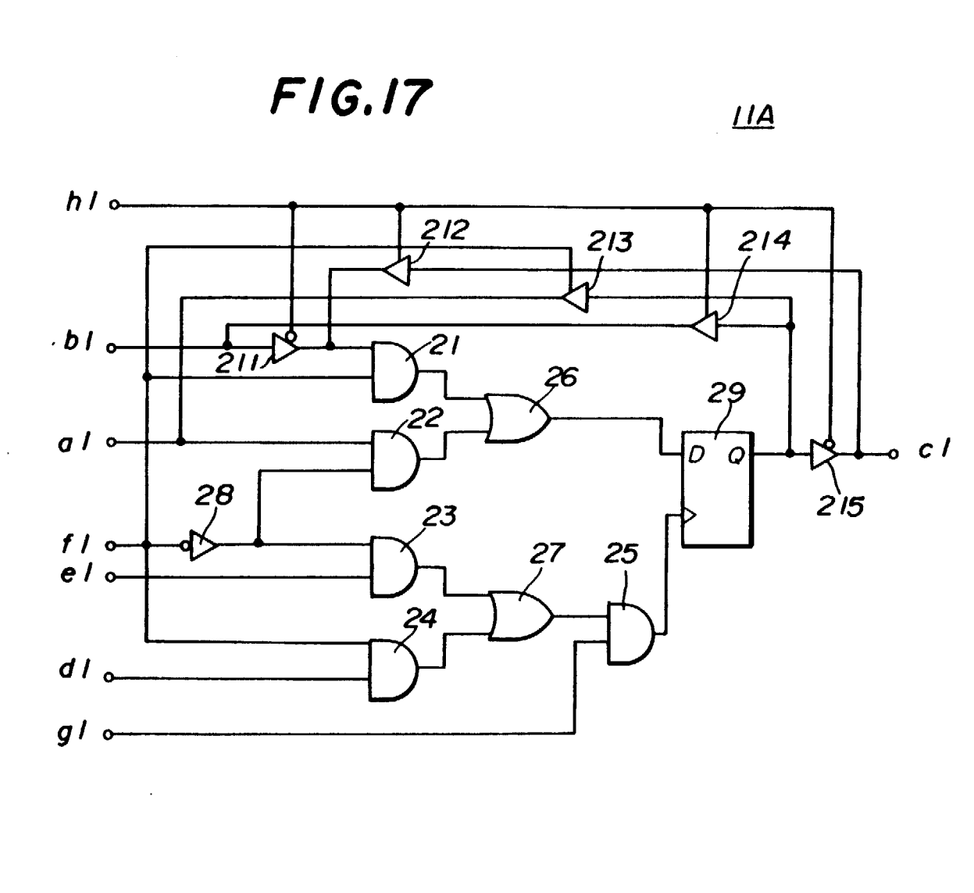
FIG. 17 is a circuit diagram showing an embodiment of the shift element shown in FIGS. 15 and 16.

FIG. 17 shows an embodiment of the shift element 11A. In FIG. 17, those parts which are the same as those corresponding parts in FIG. 7 are designated by the same reference numerals, and a description thereof will be omitted. The shift element 11A generally comprises AND circuits 21 through 25, OR circuits 26 and 27, an inverter 28, a flip-flop circuit 29, and gates 211 through 215 which are connected as shown. The same signal line designations are used as in FIG. 6. The data (character code or distance data) which is received from the register 4 or 5 shown in FIG. 3. is applied to the load data input line a1, while the data which is shifted and output from a previous stage is applied to the shift data input line b1. The held data is output on the shift data output line c1. The shift mask signal for controlling the shift is applied to the shift mask line d1 from the shift controller 7. The load mask signal for controlling the data input is applied to the load mask line e1 from the shift controller 7. In addition, the load/shift signal for selecting the shift or the load mode is applied to the load/shift designation line f1 from the shift controller 7. The clock signal from the shift controller 7 is applied to the clock input line g1. Furthermore, a shift up/down signal from the shift controller 7 is applied to the shift up/down line h1 which determines whether the shift array 1 (or 2) is to shift up or shift down.

When reading the sorted data after the sorting is ended, the shift controller 7 supplies the shift up/down signal, a high-level shift/load signal and the clock signal to the shift array 1 (or 2) to successively read out the sorted data in a sequence dependent on the size or priority of the key (distance data in this case). In other words, the sorted data are successively read out in sequence from the data with the smallest key when the shift up/down signal is set to a high level and are successively read out in sequence from the data with the largest key when the shift up/down signal is set to a low level.

Further, the present invention is not limited to these embodiments, but various variations and modifications may be made without departing from the scope of the present invention.

What is claimed is:

1. A sorting apparatus, comprising:
  A) holding means for holding input data and a corresponding key;
  B) shift array means for holding data and corresponding keys in a plurality of stages, said shift array means having a load mode and a shift mode;
  C) comparator means for performing both functions a) and b):
    a) simultaneously comparing 1) and 2):
      1) the input data and the corresponding key, which are held in said holding means, with
      2) the data and the corresponding keys held in said shift array means; so as to prevent the same input data from being held within the shift array more than once; and
    b) outputting comparison results of a comparison of 1) and 2); and
  D) control means for controlling said shift array means:
    a) in the load mode for loading the input data and the corresponding key held in said holding means, and
    b) in the shift mode for shifting the data and the corresponding keys in said shift array means; depending on the comparison results received from said comparator means, so that the data and the corresponding keys are arranged in said shift array means in a sequence dependent on a priority of the keys wherein each of said key is a distance between (a) a feature pattern of the character code and (b) a registered feature pattern in a dictionary.

2. The sorting apparatus as claimed in claim 1 wherein said shift array means comprises a first shift array for holding the data in the plurality of stages and a second shift array for holding the keys of the data held in said first shift array in the plurality of stages, said first and second shift arrays respectively having the load and shift modes.

3. The sorting apparatus as claimed in claim 2 wherein said first and second shift arrays have identical construction with N shift elements in each of M stages, each shift element having a terminal for receiving the data from said holding means, a terminal for receiving the data from a corresponding shift element of a previous stage, terminals for receiving control signals from said control means controlling a mode of the shift element to one of the load and shift modes, and a terminal for receiving a clock signal from said control means.

4. The sorting apparatus as claimed in claim 3 wherein each shift element further has a terminal for receiving a control signal from said control means for determining a shift direction, thereby the data and the corresponding keys being readable from said shift array means in an arbitrary sequence dependent on the priority of the keys.

5. The sorting apparatus as claimed in claim 1 wherein said data is a character code and said key is a distance between a feature pattern of the character code and a registered feature pattern in a dictionary.

6. A sorting apparatus, comprising:
A) holding means for holding input data and a corresponding key;
B) shift array means for holding data and corresponding keys in a plurality of stages, said shift array means having a load mode and a shift mode;
C) comparator means for performing both functions a) and b):
   a) simultaneously comparing 1) and 2):
      1) the input data and the corresponding key, which are held in said holding means, with
      2) the data and the corresponding keys held in said shift array means; so as to prevent the same input data from being held within the shift array more than once; and
   b) outputting comparison results of a comparison of 1) and 2); and
D) control means for controlling said shift array means:
   a) in the load mode for loading the input data and the corresponding key held in said holding means, and
   b) in the shift mode for shifting the data and the corresponding keys in said shift array means; depending on the comparison results received from said comparator means, so that the data and the corresponding keys are arranged in said shift array means in a sequence dependent on a priority of the keys;
wherein said holding means includes a first register for holding the input data and a second register for holding the key of the input data wherein each of said keys is a distance between (a) a feature pattern of the character code and (b) a registered feature pattern in a dictionary.

7. A sorting apparatus, comprising:
A) holding means for holding input data and a corresponding key;
B) shift array means for holding data and corresponding keys in a plurality of stages, said shift array means having a load mode and a shift mode;
C) comparator means for performing both functions a) and b):
   a) simultaneously comparing 1) and 2):
      1) the input data and the corresponding key, which are held in said holding means, with
      2) the data and the corresponding keys held in said shift array means; so as to prevent the same input data from being held within the shift array more than once; and
   b) outputting comparison results of a comparison of 1) and 2); and
D) control means for controlling said shift array means:
   a) in the load mode for loading the input data and the corresponding key held in said holding means, and
   b) in the shift mode for shifting the data and the corresponding keys in said shift array means; depending on the comparison results received from said comparator means, so that the data and the corresponding keys are arranged in said shift array means in a sequence dependent on a priority of the keys;
wherein said holding means includes a first register for holding the input data and a second register for holding the key of the input data; and
wherein said comparator means includes a first comparator for simultaneously comparing the input data which is held in said first register with the data held in said first shift array and for outputting a first comparison result and a second comparator for simultaneously comparing the key that is held in said second register with the keys held in said second shift array and for outputting a second comparison result, said control means controlling said shift array means to the load and shift modes so that the data and the corresponding keys are arranged in said first and second shift arrays in the sequence dependent on the priority of the keys.

8. The sorting apparatus of claim 7, wherein:
A) said first and second shift arrays have identical construction with N shift elements in each of M stages; and
B) each shift element includes:
   a) a terminal for receiving data from said holding means;
   b) a terminal for receiving data from a corresponding shift element of a previous state;
   c) terminals for receiving control signals from said control means controlling a mode of the shift element to one of the load and shift modes; and
   d) a terminal for receiving a clock signal from said control means.

9. The sorting apparatus of claim 8, wherein:
each shift element further includes a terminal for receiving a control signal from said control means for determining a shift direction, so that the data and the corresponding keys are readable from said shift array means in an arbitrary sequence dependent on the priority of the keys.

10. The sorting apparatus of claim 7, wherein:
said data is a character code; and
said key is a distance between (a) a feature pattern of the character code and (b) a registered feature pattern in a dictionary.

* * * * *